United States Patent [19]

Noller et al.

[11] 4,336,860
[45] Jun. 29, 1982

[54] MATERIAL HANDLING VEHICLE HAVING IMPROVED DEADMAN CONTROL

[75] Inventors: Fred W. Noller, Muscatine; James C. Kramer, Davenport, both of Iowa

[73] Assignee: The Prime-Mover Co., Muscatine, Iowa

[21] Appl. No.: 115,055

[22] Filed: Jan. 24, 1980

[51] Int. Cl.³ .............................................. B60K 1/00
[52] U.S. Cl. ................... 180/273; 187/9 R; 303/19
[58] Field of Search ............. 187/9 R, 9 E; 180/272, 180/273, 275; 192/3 TR; 318/261, 258, 273; 303/19, 68

[56] References Cited

U.S. PATENT DOCUMENTS

| | | | |
|---|---|---|---|
| 3,080,019 | 3/1963 | Hastings, Jr. | 187/9 R |
| 3,280,401 | 10/1966 | Cook et al. | 318/258 |
| 3,280,933 | 10/1966 | Jones | 180/273 |
| 3,525,423 | 8/1970 | Sheiry, Jr. | 188/106 |
| 3,848,692 | 11/1974 | Messner | 180/253 |
| 3,870,119 | 3/1975 | Wurst | 180/54 R |
| 3,976,158 | 8/1976 | Shaffer | 180/132 |
| 4,061,053 | 12/1977 | Keene et al. | 74/560 |
| 4,111,283 | 9/1978 | Hastings, Jr. | 187/9 R |
| 4,116,296 | 9/1978 | Pleier et al. | 180/273 |

*Primary Examiner*—Robert J. Spar
*Assistant Examiner*—Kenneth Noland
*Attorney, Agent, or Firm*—Neuman, Williams, Anderson & Olson

[57] ABSTRACT

A material handling vehicle is disclosed which is in the form of a battery-operated lift truck having a drive unit including an electric motor and a brake and having a hydraulically operated power steering system controlled from a steering wheel on a vertically movable platform. A pump of the power steering system is operated by an electric motor which is energized through a deadman switch on the operator's platform. The brake of the drive unit is spring-biased toward an engaged condition and is released by a hydraulic cylinder supplied with fluid from the power steering pump, the brake being released by the hydraulic back pressure of the power steering system.

10 Claims, 6 Drawing Figures

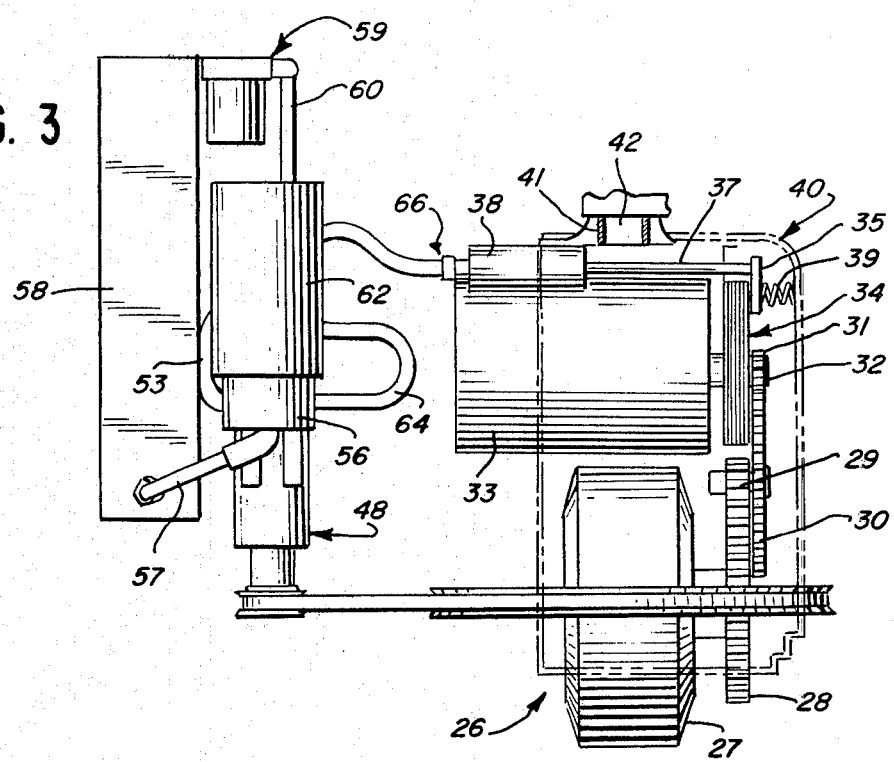
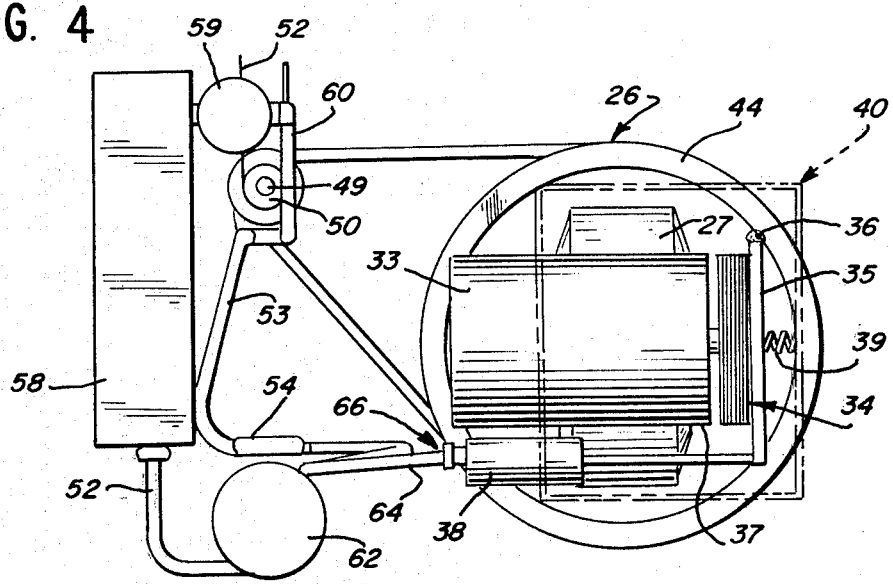
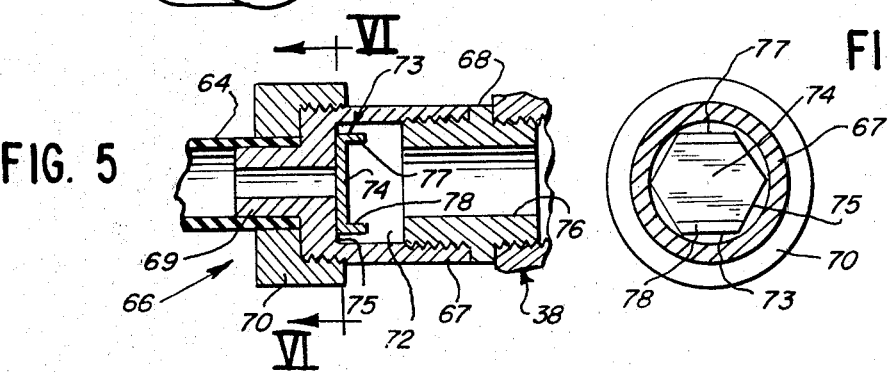

MATERIAL HANDLING VEHICLE HAVING IMPROVED DEADMAN CONTROL

This invention relates to a material handling vehicle having an improved deadman control and more particularly to a control which reduces operator fatigue while being safe and highly reliable in operation. The arrangement is control simple and reduces the cost of manufacture of the vehicle.

BACKGROUND OF THE INVENTION

Material handling vehicles such as fork lift trucks have had various types of construction. In a typical type of vehicle, a drive unit is provided, usually including an electric motor, for causing travel of the vehicle from one point to another, a steering mechanism is provided to control direction of travel, a fork lift mechanism is provided, usually including a hydraulic actuator, and an operator's platform and associated controls are provided, for control of travel, steering and the vertical position of the fork lift. A deadman control is generally provided for disabling the controls and operating a brake in the absence of an operator on the operator's platform.

The Cook et al. U.S. Pat. No. 3,280,401 shows one specific type of construction in which a single manually operable control element controls vehicle braking, travel speed and forward and reverse travel direction. The control element is connected to a master fluid actuator which is connected to a brake actuator to release brakes when moved to or beyond a "coast" position and which is also connected to an actuator for compressing a variable resistor of the carbon-pile type connected in circuit with drive motors of the vehicle. The master fluid actuator is also connected to a plurality of pressure responsive switches for controlling operation of the drive motors in different speed ranges. The brake actuator operates against the force of brake-engaging springs. A solenoid-operated valve is connected through a deadman switch to a power source to be operated to a closed position when an operator stands on his platform and to be operated to an open position to by-pass the brake actuator when no operation is present, thereby causing the spring to apply the brake.

In another type of construction, a pedal is provided on which the operator must stand to close an electrical circuit and to apply power to travel, steering, lift and other functions. The pedal is connected to a master cylinder coupled to a slave cylinder which operates against the force of a brake-applying spring to release a brake when an operator stands on the pedal. In this type of construction, the operator's platform may be vertically movable along with a fork and a suitable cable and sheave linkage is provided between the pedal and the master cylinder located in the main frame of the vehicle. In the alternative, the master cylinder is located on the operator's platform and a reeled hose arrangement is provided between the master cylinder and a slave cylinder which is located on the main frame of the vehicle. A power steering assembly may be provided including a pump driven by an electric motor and coupled to a hydraulic actuator connected mechanically to a drive unit which is turnable about a vertical axis and which journals a wheel driven from an electric drive motor of the drive unit. The steering actuator is controlled from a steering wheel on the operator's platform, through a suitable cable and sheave arrangement allowing vertical movement of the platform.

The construction of the Cook et al. U.S. Pat. No. 3,280,401 also includes a power steering system having a pump driven by an electric motor. The Shaffer U.S. Pat. No. 3,976,158 discloses a specific type of power steering mechanism for a fork-lift truck with pressure accumulating means being provided in a manner such as to reduce the frequency of energization of a drive motor for a power steering pump.

There are many other disclosures of power steering systems and drive control and braking systems for various types of vehicles. The Wurst U.S. Pat. No. 3,870,119 discloses a brake control for preventing creep in an automobile or other vehicle having an automatic transmission, vacuum from the engine of the vehicle being used to develop an operating force for application of a brake.

Such material handling vehicles and such power steering, drive control and braking systems have been generally satisfactory for the purposes for which they have been designed and there are problems which have not been recognized and dealt with in the prior art. One unrecognized problem is encountered with respect to the deadman controls of material handling vehicles. In such controls and particularly in the aforementioned type of construction in which the operator stands on a pedal, the required actuating force is quite large. As a result, when the vehicle is operated for a substantial length of time, the operator can become fatigued from holding the pedal depressed. This problem is especially acute with the operators who are light in weight since the pedal pressure can become quite high, from twenty to forty pounds, for example, as when high performance wet disc brakes are used.

Another problem associated with the deadman control is in connecting the deadman control on a movable platform with a braking mechanism on a drive unit associated with the main or base frame of the vehicle. To provide a direct mechanical connection, suitable cable and sheave linkages may be provided between the pedal and a master cylinder located in the main frame of the vehicle, as aforementioned. As also aforementioned, a reeled hose arrangement may be provided between a master cylinder located on the operator's platform and a slave cylinder located on the main form of the vehicle. With such arrangements, problems can develop with wear and tear on the cable and sheave linkages and reeled hose arrangements, after repeated raising and lowering of the operator's platform.

SUMMARY OF THE INVENTION

This invention was evolved with the general object of providing an improved material handling vehicle which can be operated for long periods of time with minimal fatigue of the operator and which remains reliable in operation after long periods of use.

The invention resides in part in recognizing the problems of the prior material handling vehicles, especially with regard to the fatigue encountered in operation of the deadman pedals and reliability problems which have been encountered in connection with the deadman controls. In a vehicle constructed in accordance with the invention, the deadman control on the platform is in the form of an electrical switch requiring minimal force for actuation, and the switch controls energization of an electrically controlled system on the main frame structure of the vehicle, the brake release means being responsive to energization of the electrically controlled system to operate a brake to a released position, spring means being provided for operating the brake to an engaged position. This arrangement avoids the aforementioned operator fatigue problem and also since only an electrical connection is required between the operator's platform and the electrically controlled system on the main frame structure, an arrangement can be provided in which reliability can be maintained even after long periods of use in which the operator's platform is repeatedly elevated and lowered.

Preferably and in accordance with a specific feature of the invention, the electrically controlled system includes hydraulic means which supplies fluid pressure when the system is energized and the brake release means includes a hydraulic actuator which is coupled to the hydraulic means to be operated by fluid pressure therefrom. The hydraulic means may most preferably be a power steering pump driven by an electric motor, being operative to both release the brake and supply fluid pressure for steering the vehicle.

The system is particularly advantageous when applied in a vehicle including a vertically movable platform in that a flexible electrical connection may be provided between the deadman switch of the movable platform and an electrically controlled system which is disposed on the main frame structure of the vehicle.

In accordance with a specific feature, a flow control device is provided between the hydraulic means and the brake release means, operative in a manner such as to permit free flow in a brake-release direction while metering flow in the brake-applying direction.

This invention contemplates other objects, features and advantages which will become more fully apparent from the following detailed description taken in conjunction with the accompanying drawings.

BRIEF DESCRIPTION OF THE DRAWINGS

FIG. 3 is a view illustrating diagrammatically and in front elevation, a drive unit of the vehicle and power steering components, further illustrating the brake control arrangement of the invention;

FIG. 4 is a top plan view of the components illustrated in FIG. 3;

FIG. 5 is a sectional view illustrating a fluid control device incorporated in the system; and FIG. 6 is a sectional view taken substantially along line V—V of FIG. 4.

DESCRIPTION OF A PREFERRED EMBODIMENT

Figure 1:
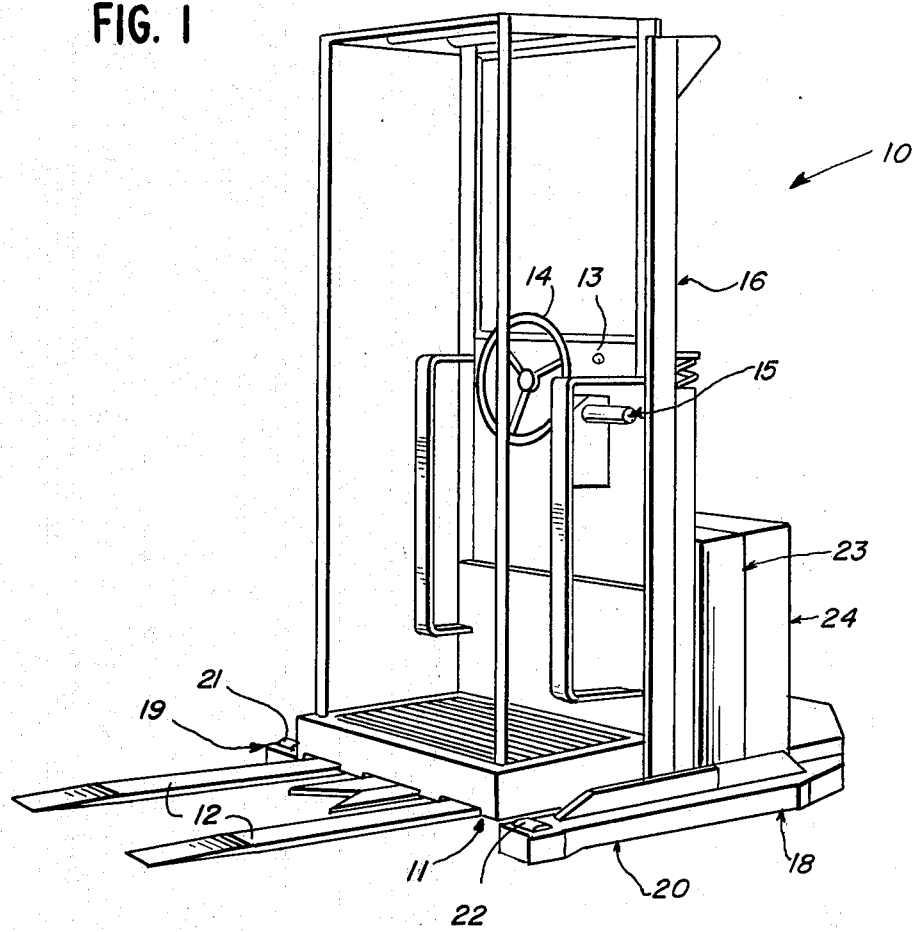
FIG. 1 is a perspective view of a material handling vehicle constructed in accordance with the invention.

Reference numeral 10 generally designates a material handling vehicle constructed in accordance with the principles of this invention. In a typical operation, the vehicle 10 is used as an order selector. An operator stands on a platform 11 and drives the vehicle rearwardly to engage forks 12 under a pallet. He then drives the vehicle in a path alongside storage racks, stopping to pick off selected cartons or articles and to place them on the pallet supported by the forks 12. When a selected carton or article is at an elevated position, the operator can operate elevation controls of the vehicle to cause the platform 11 and forks 12 to be moved vertically and to position himself opposite the selected carton or article.

The vehicle 10 is battery-operated and a key switch 13 is provided to control its energization. To control steering, a steering wheel 14 may be engaged by the left hand of the operator. To control forward and rearward drive of the vehicle, and also vertical movement of the platform 11 and forks 12, the operator may use his right hand to operate controls of a unit 15 which includes a twistable horizontal control handle and control buttons thereon.

The platform 11 and the forks 12 together with the switch 13, steering wheel 14 and control unit 15 are supported for vertical movement on a mast structure 16. The mast structure 16 projects upwardly from a base frame 18 which has rearwardly projecting portions 19 and 20 journalling a pair of rear support wheels 21 and 22. Batteries are carried within a housing structure 23 and a single forward drive and steering wheel is journalled by a drive unit disposed within a forward housing structure 24 on the base frame 18.

FIGS. 3 and 4 diagrammatically illustrate the construction of the drive unit which is generally designated by reference number 26 and which is mounted within the forward housing structure 24. The drive unit 26 includes a wheel 27 which is directly connected to a first large spur gear 28 meshed with a first small spur gear 29. The gear 29 is directly connected to a second large spur gear 30 which is meshed with a second small spur gear 31 secured to a shaft 32 of an electric drive motor 33.

A disc brake assembly 34 is provided for braking the shaft 32 of the motor 33 and thereby braking the drive wheel 27 through the gear train formed by gears 28–31. The disc brake assembly 34 is operable through a lever 35, one end of which is pivotally supported on a pin 36 and the other end of which is connected through a rod 37 to a hydraulic cylinder 38. A spring 39 is provided for acting on an intermediate portion of lever 35 and urging the brake assembly 34 to an operative braking condition. Upon operation of the hydraulic cylinder 38, the brake assembly 34 is operated to a released condition against the force exerted by the spring 39.

A suitable housing 40 is provided, indicated by broken lines, to provide support for the electric motor 33 and other fixed parts including bearings for the rotating parts. The housing 40 includes an upwardly projecting hub portion 41 which receives a downwardly projecting fixed shaft portion 42 of the frame of the vehicle, supporting the vehicle on the drive unit 26 and journalling the drive unit 26 for steering movement about a vertical axis.

A ring 44 is provided adjacent the lower end of the housing structure 40 in concentric relation to the axis of vertical movement thereof, forming a pulley which is coupled through a suitable belt 45 to pulley 46 on an output shaft of a hydraulic power steering torque generator or drive motor 48. The power steering motor 48 includes an input or control shaft 49 on which a pulley 50 is secured, pulley 50 being coupled to the steering wheel 14 through a chain 52 forming part of suitable linkage which allows vertical movement of the platform 11 and steering wheel 14.

To supply hydraulic fluid to the motor 48, it is coupled through a hose 53 and a fitting 54 to the outlet of a power steering pump 56. The inlet of the pump 56 is coupled through a hose 57 to a reservoir 58 which is connected through filter 59 and a hose 60 to the power steering motor 48.

The pump 56 is driven by an electric drive motor 62 which, as hereinafter described, is energized through a switch on the operator's platform 11. Thus, the power steering assembly may be operated when an operator is on the platform 11. In addition, and in accordance with an important feature of the invention, the brake assembly 34 is operated to a released condition through the same hydraulic system used for steering. In particular, the fitting 54 is in the form of a "T" fitting having one end connected through a hose 64 to the hydraulic cylinder 38 which operates the brake assembly 34 to a released condition, in the manner as hereinbefore described. The other end of the "T" fitting 54 is connected to the hose 53 and its center leg is connected to the outlet of the power steering pump 56.

FIGS. 5 and 6 illustrate the construction of a fitting 66 which is used to connect the hose 64 to the hydraulic cylinder 38. The fitting 66 includes a main body 67 which is threaded on a sleeve 68, the sleeve 68 being threaded into an inlet of the hydraulic cylinder 38. The body 67 has a sleeve portion 69 which receives the end of the hose 64, a suitable compression fitting 70 being threaded thereon. The body member 67 defines a central chamber 72 which receives a valve member 73 of generally hexagonal shape. The member 73 is formed to provide a central passage 74 of restricted size to provide a metering orifice. In the position as illustrated, one face of the valve member 73 seats against an internal annular shoulder 75 of the body 67. In operation, fluid flows from the cylinder 38 and through a passage 76 into the chamber 72. The valve member 73 is urged by the pressure of the fluid to seat one face thereof against the shoulder 75 and fluid flows at a restricted rate through the metering orifice 74.

The valve member 73 may be moved away from the shoulder 75 until a pair of stops 77 and 78 on the member 73 engage the end of the sleeve 68. When the fluid pressure in the hose 64 is greater than that in the hydraulic cylinder 38, the valve member 73 moves away from the shoulder 75 and toward such a position to allow relatively free flow of fluid along the outside of the valve member 73 and through passage 76 into the hydraulic cylinder 38. With this arrangement, the brake assembly 34 is quickly released in response to the application of fluid pressure through the hose 64 but it may be controllably operated to a braking condition when fluid pressure in the hose 64 is reduced below a certain value.

Figure 2:
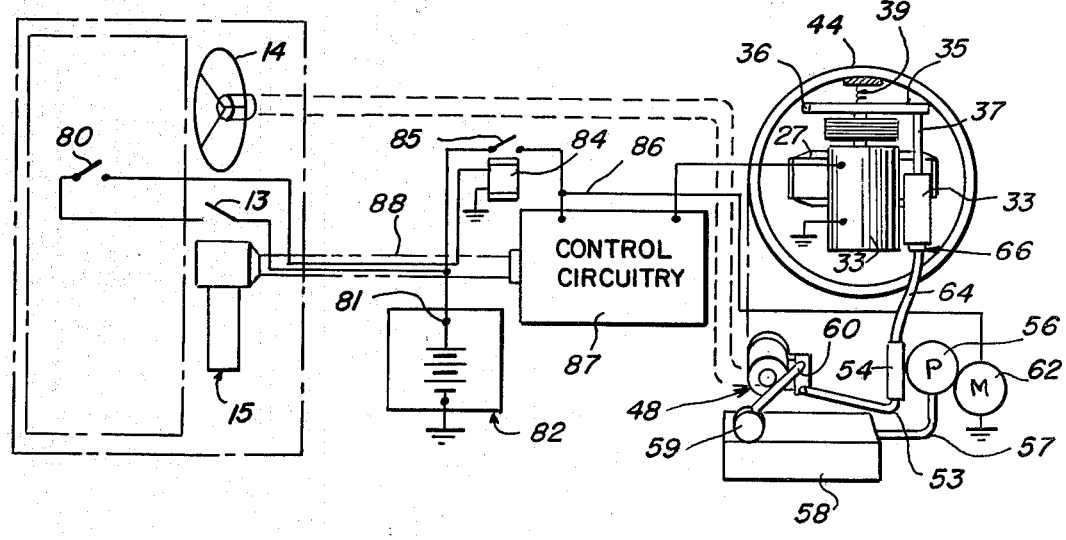
FIG. 2 is a schematic diagram of electrical circuitry of the vehicle and associated hydraulic components.

FIG. 2 diagrammatically illustrates portions of electrical circuitry and power steering components of the vehicle 10. A switch 80 is provided in the platform 11 and is arranged to be closed when an operator places his or her foot on one region of the platform 11. Switch 80 is connected in series with the key switch 13 between a terminal 81 of a battery unit 82 and a relay 84 having a contact 85 which is connected between the battery terminal 81 and a main bus 86. The bus 86 is connected to drive and lift control circuitry 87 which is connected through a cable 88 to the control unit 15 and which is also connected to the electric drive motor 33. In addition, the bus 86 is connected to the motor 62 which drives the power steering pump 56. Connecting wires to the key switch 13 and the switch 80 may be included in the cable 88 which is flexible and in the form of a coil so supported as to allow the required vertical movement of the platform 11.

With this arrangement, when the key switch 13 is closed and an operator places his or her foot on a region of the platform 11 over the switch 80, the drive and lift control circuitry 87 and also the power steering pump drive motor 62 are energized. The pressure developed by the power steering pump 56 is then applied through the hose 60 to the hydraulic cylinder 38 which, through the rod 37, operates the lever 35 to release the disk brake assembly 34, operating against the spring 39. The drive motor 33 may then be operated through the drive and lift control circuitry 87, controlled from the control unit 15. If at any time, the operator steps off of the platform 11 or otherwise removes his or her foot from the region where the switch 80 is located, the relay 84 is de-energized to open the contact 85. The motor 62 is then de-energized and the pump 56 is rendered inoperative so that fluid may flow from the cylinder 38 to allow the spring 39 to operate the brake assembly 34 to an engaged condition, thereby preventing movement of the drive wheel 27 and the vehicle 10.

The pump 56 may be a centrifugal pump with a construction such that when it is not driven, fluid may flow in a reverse direction therethrough into its outlet and out through its inlet to the reservoir 58. Alternatively, or in addition, a solenoid operated by-pass valve may be provided between the outlet and inlet of the pump, such valve being open when the solenoid thereof is de-energized and closed when the solenoid thereof is energized and being so connected electrically that the solenoid thereof is energized when the motor 62 is energized.

With the system of the invention, very little force is required on the platform 11 to operate the switch 80 and as a result, there is no undue fatigue of the operator. Since no sheave or reeled cable arrangements are required between a deadman control on the operator's platform and components which are on the main frame of the vehicle, the possibility of any malfunction from failure of such components is obviated. Also, the system is simplified and the cost of manufacture thereof is reduced. The provision of the connection between the outlet of the power steering pump 56 and the hydraulic cylinder 38 is relatively inexpensive and, at the same time, the arrangement is highly reliable.

It will be understood that modifications and variations may be effected without departing from the spirit and scope of the novel concepts of this invention.

What is claimed is:

1. In a material handling vehicle including a main frame structure, wheel means supporting said main frame structure, brake means associated with said wheel means, spring means for operating said brake means to an engaged condition, an electrically controlled system on said main frame structure including motive power means for supplying motive power to said wheel means for driving said vehicle, an operator's platform supported on said main frame structure, and a deadman switch on said platform for controlling energization of said electrically controlled system, said deadman switch being operable to an open position with no operator on said operator's platform to prevent energization of said electrically controlled system and supply of motive power to said wheel means and being operable to a closed position by an operator on said operator's platform to allow energization of said electrically controlled system and supply of motive power to said wheel means, and brake release means responsive to energization of said electrically controlled system for operating against said spring means to operate said brake means to a released position.

2. In a vehicle as defined in claim 1 wherein said electrically controlled system includes hydraulic means supplying fluid pressure when said system is energized, said brake release means including a hydraulic actuator, and coupling means coupling said hydraulic actuator to said hydraulic means to be operated by said fluid pressure.

3. In a vehicle as defined in claim 2 wherein said electrically controlled system includes an electric motor and said hydraulic means includes a pump driven by said electric motor, said hydraulic actuator being coupled through said coupling means to the outlet of said pump.

4. In a vehicle as defined in claim 2, said coupling means including a fluid flow device operative to allow free flow of fluid to said hydraulic actuator for rapid release of said brake means and to obtain metered flow in the reversal direction for controlled operation to said engaged condition.

5. In a vehicle as defined in claim 1, wherein said platform is supported for vertical movement relative to said main frame structure, said electrically controlled system being supported on said main frame structure, and a flexible electrical connection between said deadman switch of said movable platform and said electrically controlled system on said main frame structure.

6. In a vehicle as defined in claim 1, said motive power means including a drive unit associated with said wheel means and including a frame journalling one wheel of said wheel means thereon, an electric motor on said frame of said drive unit, and having a drive shaft, and a speed reduction gearing between said drive shaft and said one wheel, said brake means being operative between said drive shaft of said motor and said frame of said drive unit.

7. In a vehicle as defined in claim 6, a pivotal connection between said frame of said drive unit and said main frame structure of said vehicle for turning movements of said drive unit about a generally vertical axis, and a steering control adjacent said operator's platform, said electrically controlled system including an electric motor, a power steering pump driven by said electric motor of said system, and a hydraulic actuator coupled to the outlet of said pump and coupled to said frame of said drive unit, said actuator being additionally coupled to said steering control for control therefrom.

8. In a vehicle as defined in claim 7, said brake release means including a hydraulic actuator coupled to the outlet of said power steering pump.

9. In a material handling vehicle including a main frame structure, wheel means supporting said main frame structure, brake means associated with said wheel means, spring means for operating said brake means to an engaged condition, an electrically controlled system on said main frame structure, an operator's platform supported on said main frame structure, a steering control adjacent said operator's platform, said electrically controlled system including power steering means controlled from said steering control and coupled to said wheel means to steer the vehicle, and a deadman switch on said platform connected to said electrically controlled system to control energization thereof, said deadman switch being operable to an open position with no operator on said operator's platform to prevent energization of said electrically controlled system and operation of said power steering means and being operable to a closed position by an operator on said operator's platform to allow energization of said electrically controlled system and operation of said power steering means, and brake release means responsive to energization of said electrically controlled system for operating against said spring means to operate said brake means to a release position.

10. In a vehicle as defined in claim 9 wherein said electrically controlled system includes an electric motor energized from said deadman switch, and said power steering means includes a pump driven by said electric motor and a hydraulic actuator coupled hydraulically to the outlet of said pump and coupled mechanically to said wheel means, said brake release means also including a hydraulic actuator, and means coupling said hydraulic actuator of said brake release means to said outlet of said power steering pump.

* * * * *